March 13, 1934.  J. BIJUR  1,950,390
LUBRICATION
Filed March 11, 1927  4 Sheets-Sheet 1
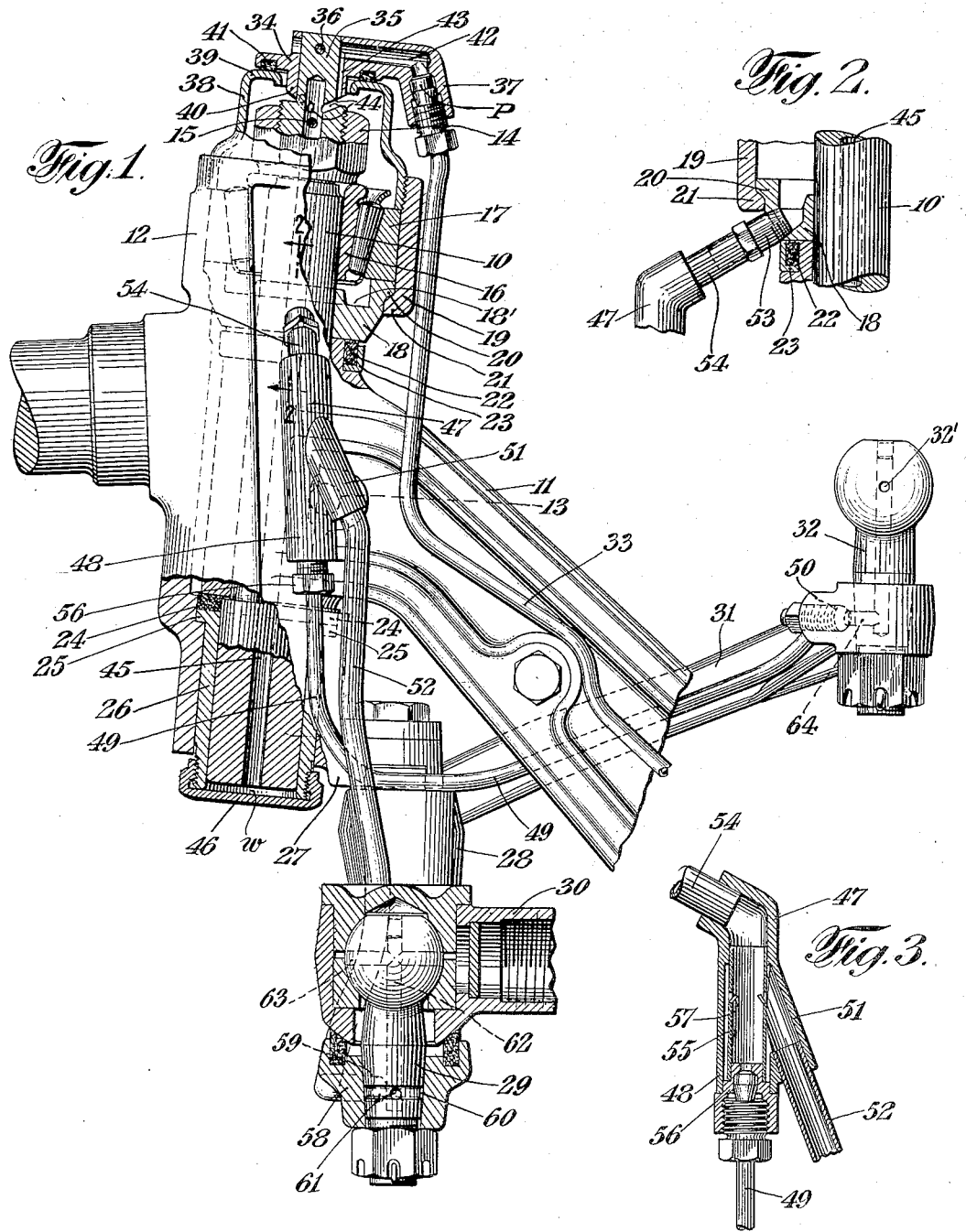
INVENTOR.
Joseph Bijur
BY
Dean, Fairbanks, Obrneght & Hirsch
ATTORNEYS.

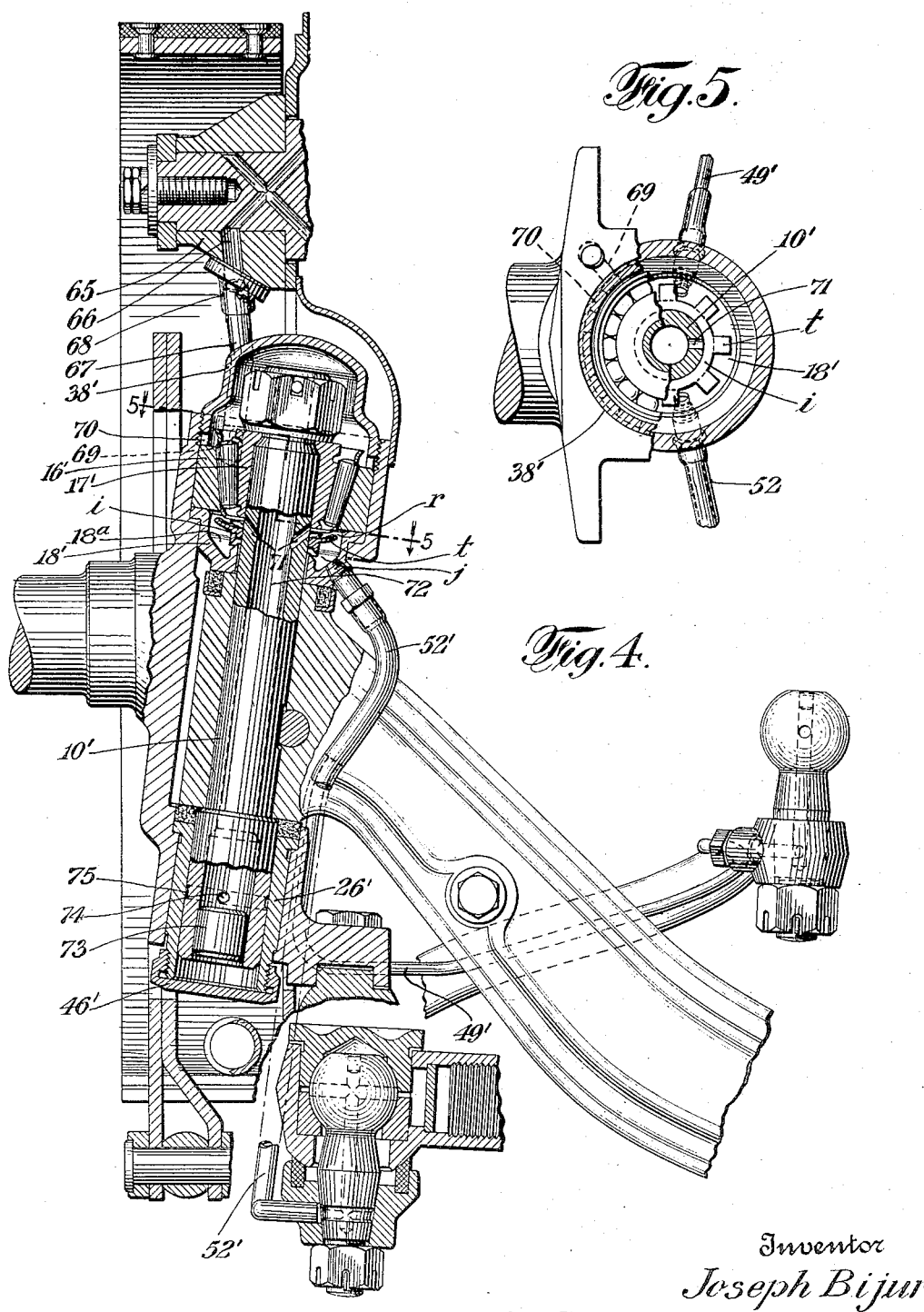

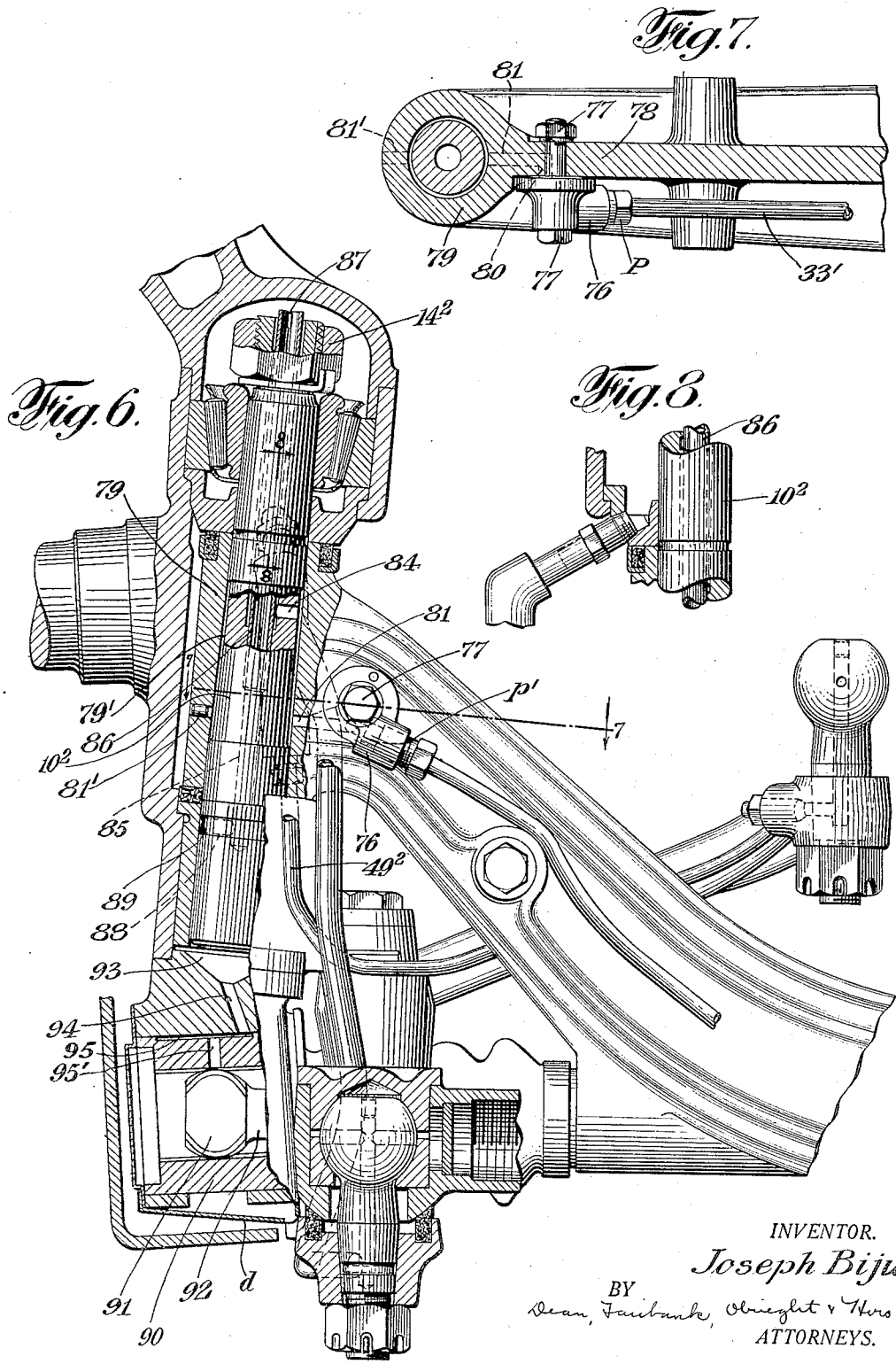

March 13, 1934.     J. BIJUR     1,950,390
LUBRICATION
Filed March 11, 1927     4 Sheets-Sheet 4
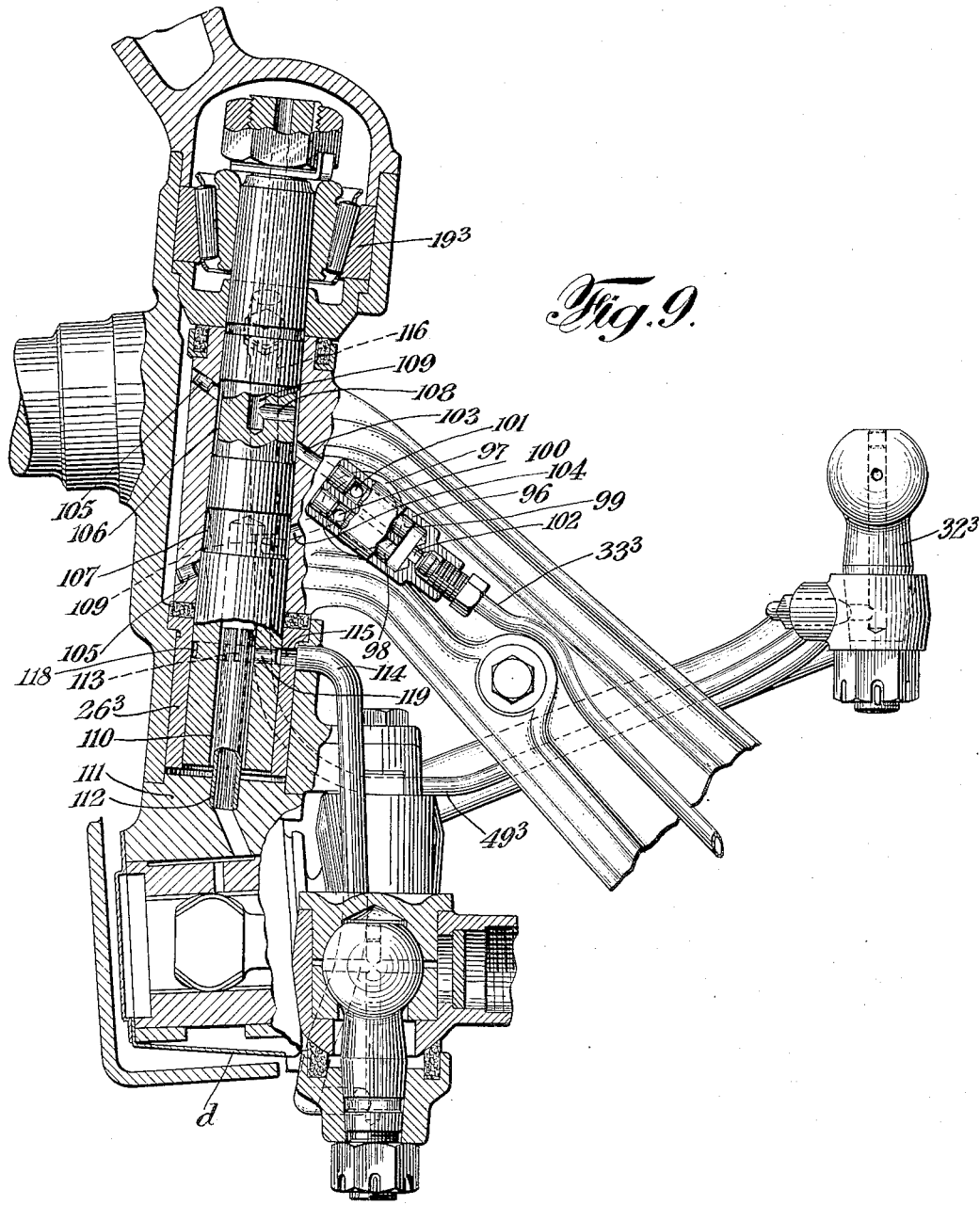
INVENTOR.
Joseph Bijur
BY
Dean, Fairbank, Obrecht Hirsch
ATTORNEYS.

Patented Mar. 13, 1934

1,950,390

UNITED STATES PATENT OFFICE 1,950,390

LUBRICATION

Joseph Bijur, New York, N. Y., assignor to Auto Research Corporation, a corporation of Delaware Application March 11, 1927, Serial No. 174,480
In Great Britain March 29, 1926

40 Claims. (Cl. 184—7)

My present invention is concerned primarily with central lubricating systems and more especially with the lubrication of bearings mounted on a part movable relative to a main lubricated structure. It has particular reference to the lubrication of the upper and lower king pin bearings, preferably but not necessarily in combination with the lubrication of the tie rod and/or steering arm bearings and in certain cases also in combination with the brake cam and/or brake key bearings.

The invention has a preferred application, although it is not limited to the lubrication from the frame or axle of a motor vehicle, of the various bearings, including the tie rod, the drag link and the king pin pivot bearings that are mounted on or associated with the pivoted steering knuckle.

Although the present invention is broadly adapted to the application of lubrication to bearings, of the character above specified, it is particularly adapted to be utilized in connection with a lubricating system such as that disclosed and claimed in my British Patent No. 237,958 operating under pressure, wherein leak might be incurred at the swivel mount of the steering knuckle were it attempted to force the lubricant thereacross for the bearings associated with the knuckle.

Among the objects of the invention are to provide a lubricating installation, which while retaining all of the advantages of a pressure system in assuring prompt and reliable delivery of the respective charges of lubricant to the vicinities of the various bearings will, nevertheless, avoid leak of lubricant at the swivel mount of the knuckle or analogous parts, without introducing any loose or flapping conduits to bridge across the swivel and will assure the prompt delivery of the lubricant free from foreign matter at the various bearings associated with and/or carried by the knuckle each receiving its correct proportion.

In one method of achieving the desired result, I locate the drip plug or other pressure absorbing terminal of a supply line according to my Patents Numbers 1,755,626, 1,755,627 and 1,755,628, in advance of the swivel mount of the steering knuckle and I arrange the conduit system on said knuckle for travel of the lubricant to the bearings by simple gravity flow or displacement.

The present invention makes special use of certain principles set forth in the above identified patents, and it particularly resides in the application of certain of said principles to the lubrication of the king pin bearings of the reverse Elliott type, wherein the upper king pin bearing is a roller bearing and in a preferred embodiment it also includes the lubrication of the tie rod arm and drag link or steering arm bearings.

Generally speaking, the present invention includes the supply of lubricant to the associated knuckle bearings by a drip plug or similar flow controlling device, the lubricant so supplied flowing by gravity in series and/or in parallel to upper and lower king pin bearings, and in certain preferred embodiments in series and/or in parallel to tie rod, drag link, brake key and/or brake cam bearings.

Lubricant is supplied by an inlet fitting through the axle eye, which communicates with radial and axial bores to cause an overflow of lubricant adjacent the top of the king pin, or it may be supplied by attaching an inlet fitting or a conduit leading from an inlet fitting to a structure adjacent the top of the king pin. All of the lubricant may be caused to pass through the upper king pin bearing, which in a preferred embodiment is a roller bearing, or part of it may be by-passed around the upper king pin bearing to the lower king pin bearing or to other of said associated bearings.

The lubricant drained away from the roller bearing is preferably collected in an annular channel in the knuckle structure below the king pin bearing and from this collecting groove it may be passed to other associated bearings, particularly the tie rod and/or the drag link or steering arm bearings. Some of the lubricant draining from the roller bearing may also be passed to the lower king pin bearing, and in turn the lubricant passing through the lower king pin bearing may be passed to associated bearings, such as the brake key and/or brake cam bearings. In one embodiment of the invention, the structure around the lower king pin bearing is so constructed as to cause the formation of a well of oil in which said lower king pin bearing is immersed.

Suitable means may be provided for dividing the lubricant supplied in parallel to the various associated bearings. One dividing means consists of a chamber provided with a stand pipe, the stand pipe being provided with slots or other openings at about the level of overflow of the chamber, some of the lubricant overflowing to one or more of the associated bearings and another part of the lubricant passing through the slots or other openings into the stand pipe and flowing to other of the associated bearings. Another dividing arrangement consists of providing a vertical or sharply inclined surface with openings therein, below which openings are provided ledges or other means serving to break the flow of lubricant downwardly over the surface and also serving to direct a portion of said lubricant into the openings. The lubricant passing to the openings is conducted to certain of the bearings and the residual lubricant flowing down over the wall or sharply inclined surfaces flowing to other of said associated bearings.

In a preferred embodiment where the lubricant is admitted through the axle eye, a bore is provided in the axle eye which communicates with an inlet fitting or drip plug at a portion of the axle removed from said axle eye. If desired, several drip plugs may be provided with conduits through the axle eye into the king pin supplying different of said associated bearings. The bore through the axle eye usually is caused to communicate with a groove in the surface of the king pin, which in turn communicates with a radial bore in the king pin, which in turn communicates with an axial bore in the king pin. The axial bore conducts the lubricant upwardly through the king pin or downwardly, as the case may be.

The inlet from the axle or frame to the steering knuckle may be effected either through an inlet cap carried by the axle and having a dust-tight swiveling connection with the upper end of the knuckle or by a bridging connection such as shown in my British Patent No. 235,687, extending across from the contiguous chassis channel frame to the upper end of the axle, or the lubricant may be admitted by way of the axle eye transversely into the king pin.

In the accompanying drawings,

Fig. 1 is a side view partly broken away and partly in section of one embodiment of knuckle, Fig. 2 is a sectional detail taken on the line 2—2 of Fig. 1, Fig. 3 is a sectional detail longitudinally through the branch fitting, Fig. 4 is a view similar to Fig. 1 of another embodiment, Fig. 5 is a transverse sectional view taken on line 5—5 of Fig. 4, Fig. 6 is a view similar to Fig. 1 of a further embodiment, Fig. 7 is a transverse sectional view on line 7—7 of Fig. 6, Fig. 8 is a detail sectional view taken on line 8—8 of Fig. 6, and;

Fig. 9 is a view similar to Figs. 1, 4 and 6 of a further embodiment.

In Figs. 1, 2 and 3, the upper clevis jaw 12 of the knuckle sustains the axle 11 upon a roller thrust bearing encircling the king pin 10, which is keyed at 13 to the axle. For this purpose, a nut 14 threaded and pinned as at 15 upon the king pin near the upper end thereof is sustained upon the inner race 16 of the thrust bearing, the outer race 17 of which rests upon a head 18 within the integral shell 19 of the knuckle, in which the roller bearing is enclosed, said head having a flange 20 resting on a shoulder 21 formed in the shell. Dust is excluded from the bearing by a yielding gasket 22 which encircles the upper end of the axle eye immediately below the head 18 and is retained in a sheet metal cup protector 23. A similar gasket 24 for a similar purpose is interposed between the flange 25 of the lower king pin bushing 26 and the lower end of the axle eye.

A tie rod arm lug 27 integral with the lower eye has bolted thereto the tie rod arm 28, which carried a ball stud 29 at its outer end, forming a bearing for the end of the tie rod 30. There is also provided in the case of the knuckle linked to the steering gear, a drag link or steering arm 31 extending at a level higher than the tie rod arm and having an upstanding ball stud 32 at its outer end. The construction thus far described is not my invention, but constitutes one of a multiplicity of constructions of knuckle that may be lubricated according to my invention.

In the embodiment of Figs. 1 to 3, the lubricant is admitted from a pipe run 33 along the axle through the upper end of the knuckle by way of a cap 34 telescoped over the reduced upper end 35 of the king pin and pinned thereto at 36, said cap having an inlet socket lug 37 at the axle side thereof, into which is threaded the terminal fitting P of pipe 33 from which the knuckle is to be supplied with lubricant. The details of the terminal fitting are not shown, as they are not by themselves a part of the invention claimed herein, but it may be noted that this fitting is preferably a drip plug nozzle of the general type shown in my British Patent No. 237,958. The pressure on the system is absorbed in said drip plug or nozzle, and the lubricant flows therefrom substantially without pressure.

A dome 38 is threaded into the upper periphery of the knuckle shell 19 and has an inturned rim 39 leaving clearance with respect to the downwardly extending hub 40 of the cap 34 and serving as an abutment for said cap, which is held yieldingly pressed thereagainst by the interposition of an annular felt washer 41 retained in a corresponding groove in the cap. The annular cap, as shown, has a radial bore 42 communicating with a longitudinal bore 43 conveying the lubricant from the drip plug P to the interior of the hood 38. Oblique bores 44 through the king pin communicate with an axial passage 45 bored from the lower end of the king pin to near the upper end thereof, through which lubricant will pass to oil the lower bearing of the king pin, the bushing of which is sealed by closure cap 46. A dividing fitting 47 is secured into the thrust bearing head 18 and has one outlet 48 connected by a pipe length 49 extending generally along the drag link arm and delivering to the eye 50 at the outer end thereof, and another branch 51 leading to a pipe 52 which extends generally downward to and along the tie rod arm to deliver to the ball stud of the latter. More specifically an adapter nipple 53 is threaded into the head 18 and has a protruding stud over which is press-fitted a pipe length 54, the opposite extremity of which is pressed and soldered into the inlet of the branch fitting 47. Without special safeguard, it will be clear that most of the lubricant drained from head 18 would pass to the tie rod bearing which is substantially directly below the branch rather than to the less favorably located drag link bearing. Accordingly, the main length of the branch fitting has a pipe length 55 fitted therein, telescoped over the inner end of an outlet plug 56 to which the upper end of the drag link pipe 49 is secured by an appropriate coupling. The pipe 55 has inturned tangs 57 affording small ports through which a small portion of the lubricant trickling along the wall thereof escapes to the branch 51 and proceeds through pipe 52.

The pipe length 52 is of relatively large bore of diameter in the order of 6 mm. or more and is connected at its lower end at an inlet terminal 58 feeding through a radial bore 59 in the eye across the taper-fitted shank of the ball stud to a peripheral groove 60 about the stud, communicating by way of radial bore 61 to an axial bore 62 which, in turn, delivers by way of radial bores 63 to the bearing. The conduit 49 to the drag link or steering arm bearing has a similar connection except that in this case, I have illustratively shown the radial bore 64 of the ball stud aligned with the inlet 50 thereto and the peripheral groove in thus dispensed with.

In operation, lubricant after passing through the pipe 33 and drip plug P from the source then passes substantially devoid of pressure, by way of the cap 34 to the interior of the dome 38. Some of this lubricant will flow over the nut 14 and traverse the rollers of the thrust bearing 16—17 lubricating the latter, and settling in the annular trough 18' of the head 18 from which it is drained through the branch fitting 47. A part of the lubricant will pass from bore 42 into one of the bores 44 and by way of large axial bore 45 of the king pin to the closed well $w$ between the lower end thereof and cap 46, from which well the lubricant will rise in bushing 26 to lubricate the lower kind pin bearing.

Normally lubricant is trapped in the length of pipe 49, which extends below the outlet bore 32' of stud 32.

The bore of the pipe 55 and the cross-section of the passage thereabove at level higher than that of the bearing outlet are sufficiently large to prevent air blocking, the lubricant in every case passing down substantially along a wall of the conduit, about any air therein and settling upon the column of trapped lubricant. Overflow then occurs at the outlet 32' of stud 32 until equilibrium is restored in the oil trapping passage. The oil trapping length of pipe 49 below the outlet of ball stud 32 may be of small bore as shown, since it remains filled completely with lubricant. In that case, however, the branch fitting should be mounted in such relation that the trapped lubricant will maintain a level above the lower end of pipe 55 and below the tangs 57.

A small fraction of lubricant admitted to the tube 55 trickles past tangs 57 and by way of the pipe 52 into the tie rod bearing 29. The length of the conduit 52 is also of large diameter, 6 mm. bore or more to prevent air blocking or arresting. The lubricant in this case also trickles down along the wall of the pipe about the air remaining in the pipe.

By reason of the large diameter of pipe 52 and of the branch fitting passage 55 connecting the same with the drag link pipe 59, no siphoning will occur from the drag link bearing at higher level through the tie rod bearing at lower level. This follows because no continuous column of lubricant can collect in the tie rod pipe 52 to exert a siphoning tension, the volume of air imprisoned in the connecting pipe being so large that no vacuum can be formed therein of sufficient magnitude to permit drawing along lubricant from the drag link bearing.

In the standard size ball studs 29 and 32 preferably employed, it is desirable to maintain the lubricant conveying bores of small diameter of about 3 mm. bore in order to avoid weakening the structure and reducing the effective bearing surface thereof. This construction is entirely feasible since the ball studs shown, extend upward and the weight of lubricant normally filling the axial bores thereof, exerts no siphoning tension. My construction is, however, even applicable in arrangements in which one or both of the ball studs extend downward inasmuch as the short height of lubricant that would normally maintain the small axial bore thereof filled would be of weight too little to exert a siphoning tension sufficient to impair the operation.

Thus even though the oil soaked gasket 41 at the top of the knuckle in excluding dirt substantially seals against venting or entry of air, the flow of lubricant, nevertheless, takes place as if the system were vented, the air within the system merely remaining or moving about therein out of the path of flowing lubricant and never becoming imprisoned by the columns or bodies of lubricant. As lubricant passes out of any pipe to a bearing, air from another part of the system may enter to maintain substantially atmospheric pressure in the connecting pipe between the bearings. Without using large axial holes at the ball studs, and without using large weakening radial holes in the king pin of a steering knuckle, I thus reconstitute the parts so that the desired quantity of oil flows to each bearing that I desire to lubricate as if it flowed down open troughs by gravity, reaching its terminals promptly after the oil has been supplied to the central distributing place, just as promptly as if there were no tendency of the parts to siphon from one to the other and as if no air blocking were present, the delivered oil, moreover, remaining clean in transit.

In Fig. 4 is shown a fragmentary view of another application in which the lubricant is conveyed to the knuckle not by a conduit along the axle, but through a conduit bridging directly from the frame to the upper end of the knuckle. For this purpose a bridging cross conduit which may be embodied in a brake operating rock shaft, 100 is employed, illustrative types of the construction of which are shown in my British Patent No. 235,687. I have, accordingly, indicated in the present view, merely the outlet end of such rock shaft, including the bearing hub 65 therefor in the brake shield, it being understood that the lubricant is admitted to said cross shaft through a drip plug (not shown) at the frame end thereof as in my Patent No. 237,958. The lubricant passes through a radial bore 66 in the bearing 110 hub which delivers into a pipe 67 connected thereto at its upper end by fitting 68 and connected laterally of dome 38' at its lower end, emptying through bore 69 into the dome, the inner rim of which is notched at 70 and the threads of which are relieved at said notches for ready flow of the oil. Dome 38' has no opening at its top and affords a dust-tight closure. The lubricant that has traversed the roller bearing drips from the rim of retaining ring $r$ upon an annular intercepter washer $i$ press-fitted about the king pin immediately below the outer ends of oblique bores 71 in the king pin 10'. The intercepter has a multiplicity of teeth $t$ at its outer end, which serve as runways to direct lubricant from the roller bearing to the oblique bores 71. The lubricant that passes through the spaces between teeth $t$, drips into the trough 18$a$, the intercepter being formed with a peripheral downwardly extending sharp ridge $j$ from which will drip into the trough, any lubricant trickling down the lower surface of the intercepter. The intercepter thus serves to reliably divide the lubricant. The lubricant that has passed from the intercepter through bores 71 proceeds through a large-diameter axial bore 72 in the king pin plugged at 73 at its lower end. The lubricant collecting above plug 73 overflows through radial bore 74 to peripheral groove 75 from which the lower king pin bearing is supplied, and leakage from said king pin bearing is prevented by screw cap 46' threaded over the lower end of bushing 26'.

In the present embodiment, in lieu of the dividing fitting shown in Fig. 1, the pipes 52' and 49' to the tie rod and drag link or steering arm bearings respectively are provided with separate and distinct inlets constituting a fitting similar to that supporting the dividing fitting 47 in Fig. 1.

In the embodiment of Figs. 6, 7 and 8, the lubricant is admitted to the knuckle not at the upper end thereof but by way of the axle eye. The king pin $10^2$ has a taper fit in the axle eye, the weight of the axle and body resting on said tapered length of king pin and effecting a lubricant-tight fit, so that lubricant can be passed thereacross without leak. A fitting 76 mounting drip plug P' as in Fig. 1 is secured by a bolt and nut 77 flat against the web 78 of the axle contiguous to the axle eye 79. The lubricant is conveyed from fitting 76 into bore 80 in the axle beam to the inner periphery of the eye, by way of bore 81 drilled across the eye 79 and plugged at its outer end 81'. The king pin is reduced in diameter or relieved at 79' adjacent bore 81 so that lubricant will pass without leak to the annular cavity thus formed about the middle of the king pin. From cavity 79' the lubricant proceeds radially inward, through bore 84 to an axial bore 85 extending downward from the upper end to near the lower end of the king pin. A pipe 86 is friction-fitted into a short length of the bore 85, said bore being enlarged above said supporting portion to determine a small annular space thereabout, into which the radial bore 84 delivers. The pipe 86 protrudes somewhat above the upper end of the nut $14^2$ and is slotted vertically as at 87 thereat. It follows that lubricant admitted through drip plug P' will pass by way of bores 80 and 81 to the annular space 79' about king pin $10^2$, thence by way of bore 84 into the restricted space about the pipe 86 through which space it rises by displacement, overflowing at the top, part inward through slot 87 and downward through the pipe 86 and through axial bore 85, radial bore 88 and peripheral groove 89 to supply the lower bearing of the king pin. Part of the lubricant from the annular space about pipe 86 overflows outward into the roller bearing structure from which it is drained either by the arrangement shown, similar to Fig. 1 or by that of Fig. 4.

I have here indicated a brake of the type in which the operating member is directly sustained on the axle and includes a cam 90 directly below the king pin in the form of a shell enclosing a key 91 at the end of the brake shaft 92. The structure immediately below the king pin is formed as a well 93 draining lubricant that has passed the lower king pin bearing through an oblique bore 94 delivering to a groove 95 longitudinally of the cam, from which oil spreads peripherally about the cam. A bore 95' through the cam delivers part of the oil from the groove to lubricate the bearing surface of key 91. Any excess lubricant from the brake flows along sheet metal guide $d$, to the road and is thereby kept from the brake lining.

In Fig. 9 I have shown a construction differing from the others in that a primary division of the lubricant is effected prior to admission thereof to the knuckle. In this embodiment, a fitting 96 generally similar to that of Fig. 6 is mounted in substantially the same relation by means of a cap screw 97, said fitting being formed as a cartridge to house two drip plug elements 98 and 99 having distinct outlets 100 and 101 respectively into the face of the axle web, both drip plugs supplied through a common inlet 102 from the pipe line $33^3$. The eye of the axle is bored obliquely with an upwardly inclined bore 103 leading from drip plug 99 and a downwardly inclined one 104 from drip plug 98. The outer ends of both bores are plugged as at 105 so that the respective bores will deliver to the surface of the king pin which is reduced at an area 106 for intercepting lubricant from bore 103 and separately at 107 for intercepting lubricant from bore 104. Lubricant from bore 103 passes by displacement through radial bore 108 in the king pin and thence through the upper end thereof by way of a corresponding longitudinal bore 109, the overflow from which passes through the roller bearing $19^3$ to lubricate the latter, and is drained therefrom to the drag link or steering arm bearing $32^3$ by way of a pipe $49^3$ similar to that shown at 49 in Fig. 1.

The groove 107 supplied from bore 104 communicates by way of a radial bore 109 in the king pin with an axial bore 110 of relatively large diameter extending upward from the lower end of the king pin to slightly beyond said bore 109. Friction-fitted into the brake support structure 111 below the king pin is a stand pipe 112 slotted at its upper end 113 and extending axially with substantial clearance up into the bore 110. Extending immediately above the level of the bottom of slot 113 I provide the upper end of a pipe 114 fixed in the knuckle and supplied from the king pin through a port 115 in the bushing $26^3$, said pipe extending downward for connection to the tie rod bearing in the manner heretofore described.

The king pin is provided with a peripheral groove 118 at the level of port 115 and a radial slot 119 in the king pin establishes an open connection from bore 110 to port 115 by way of groove 118.

By the arrangement disclosed, it will be seen that lubricant from drip plug 98 passes through bore 104, groove 107, bore 109 and bore 110 to trickle downward along the wall of said bore to the well below the bushing, whence the lubricant will rise between the king pin and the encircling bushing $26^3$ and also through the annular space between the bore 110 and stand pipe 112. When the lubricant reaches the level of the upper end of pipe 112, part will flow through slit 113 and through pipe 112 to supply lubricant to the brake cam shaft and part will flow through bore 119, groove 118, port 115 and pipe 114 to the tie rod bearing.

In the present embodiment, no siphoning can occur from the upper drag link or steering arm bearing to the lower tie rod or other bearings, since direct communication therebetween is shut off by the valves (not shown) in the drip plugs 98 and 99. The pipe leading to the drag link or steering arm bearing, is in this case of large diameter as at 116 down to a level at least as low as that of the outlet of ball stud $32^3$, so that no air can be imprisoned between the lubricant trapped in pipe $49^3$ and that admitted at the inlet of said pipe, the trapping length of pipe $49^3$ being preferably of small bore.

By the expression associated bearing or bearings utilized in the accompanying claims is meant the upper and lower pin bearings; knuckle control bearings such as the tie rod and/or drag link or steering arm bearings; and in some cases the brake cam and/or the brake key bearings; or any combination of one, two or more of these associated bearings.

By the expression associated bearings is also included control bearings, subsidiary bearings, or bearings carried or adjacent to the knuckle, which expressions are also intended to include the bearings as stated above.

I claim:—

1. A steering knuckle of the type having clevises encircling and bearing upon the protruding upper and lower ends of a king pin fixed in the axle and including an enclosed roller bearing in the upper clevis encircling said king pin and sustained upon a head resting on top of the axle; the combination therewith of a lubricant inlet cap fixed upon the upper end of the king pin and affording one or more passages into the enclosure for said roller bearing, said king pin having one or more lateral bores in the upper end thereof, leading inward from said enclosure and a longitudinal bore in communication therewith for feeding lubricant to the lower bearing thereof.

2. A steering knuckle with associated bearings of the type having clevises encircling and bearing upon the protruding upper and lower ends of a king pin fixed in the axle and including an enclosed roller bearing in the upper clevis sustained upon a head resting on top of the axle; the combination therewith of a lubricant inlet cap fixed upon the upper end of the king pin and affording one or more passages into the enclosure for said roller bearing, said king pin having one or more lateral bores in the upper end thereof, a longitudinal bore in communication therewith for feeding lubricant to the lower bearing thereof, and one or more lubricant conveying pipes extending along the knuckle to the bearings thereof and supplied from the sustaining head.

3. In a lubricating system for a steering knuckle with associated bearings including an upper king pin bearing, means for supplying lubricant to the upper king pin bearing from above said bearing so that the lubricant will overflow and seep downwardly through said upper king pin bearing, means for collecting lubricant which has passed through said upper bearing and means for dividing and conducting said lubricant to said associated bearings in the proper proportion.

4. In the system of claim 3, where the king pin is provided with upper and lower bearings, the provision of a lubricant-tight structure surrounding the lower end of and below the king pin, receiving lubricant from the supplying means and keeping the lower king pin bearing fully lubricated.

5. A knuckle lubrication system for a knuckle having upper and lower king pin bearings and knuckle control bearings comprising means for supplying lubricant to the upper king pin bearing, a collecting chamber below said bearing and a split conduit system leading to the control bearings from the chamber.

6. In a lubricating installation for a plurality of bearings at different levels, a dividing means which consists in part of a cylinder, a chamber within said cylinder communicating with the outside of said cylinder by means of bores through the walls of said cylinder, a ledge completely encircling said cylinder below said bores and above the upper bearing and means for flowing lubricant down over the outside of said cylinder, part of said lubricant overflowing said ledge into the upper bearing and part passing into said chamber to lower bearings.

7. A lubricating arrangement for a plurality of bearings at different levels comprising means to pass the lubricant to and through an upper bearing, means to collect and distribute the lubricant after said passage to one or more of a plurality of lower bearings and a lubricant dividing arrangement including a sloping surface, a chamber, openings from said surface into said chamber, means to flow a film of lubricant over said surface, obstructions upon said surface below said openings to break the flow of lubricant whereby part of said lubricant is diverted into said openings and thereby into said chamber and means to pass the divided lubricant to one or more of a plurality of said lower bearings.

8. A lubricating installation including a plurality of bearings at different levels, means to pass lubricant through an upper bearing, means to collect the lubricant after said passage, means to distribute it after such collection to one or more of a plurality of lower bearings and means to divide the flowing lubricant to one or more of a plurality of said lower bearings comprising concentric, cylindrical receivers, means to supply lubricant to one of said receivers, minute passageways connecting said receivers so arranged that a part of the lubricant supplied to said one receiver will flow into said other receiver and means for conducting the divided lubricant to at least one of said lower bearings.

9. A knuckle lubrication system for the upper and lower king pin bearings of a knuckle structure comprising an inlet for supplying lubricant to adjacent the top of the knuckle structure above said upper king pin bearing, separate passageways leading to the upper and lower king pin bearings from adjacent the top of the knuckle structure and proportioning means for dividing the lubricant so that part will flow to the upper king pin bearing and part will flow to the lower king pin bearing, said means being positioned ahead of said king pin bearings and ahead of said passageways in the course of lubricant flow.

10. In a steering knuckle of the type having clevises encircling the protruding ends of a king pin fixed in the axle and including an enclosed roller bearing in the upper clevis sustained upon a head resting on top of the axle; the combination therewith of a pipe fixed at its inlet end in said head and extending along the knuckle structure to a bearing thereof, said king pin having a bore leading to the lower bearing thereof and a washer encircling said king pin, below said roller bearing, intercepting drip therefrom and dripping at its rim into said head and draining from its middle through one or more bores in the wall of the king pin.

11. A knuckle of the type including bearings straddling an axle and encircling the protruding ends of a king pin fixed in said axle, a brake on said knuckle and a cam at the lower part of said knuckle below said king pin for operating said brake; the combination therewith of means for feeding lubricant into said knuckle to supply the lower bearing of said king pin and a drain passage from said king pin to the cam structure therebelow.

12. A knuckle of the type including bearings straddling an axle and encircling the protruding ends of a king pin fixed in said axle, a brake on said knuckle and a cam at the lower part of said knuckle below said king pin for operating the brake; the combination therewith of means for feeding lubricant into said king pin, the structure of said knuckle confining the lubricant from escape below said king pin, whereby the lubricant will rise in the lower bearing of the king pin to lubricate the latter, a stand pipe fixed in the structure below said king pin and extending upward longitudinally thereinto and a cross bore in said king pin for draining excess lubricant into said stand pipe, said stand pipe communicating with the bearing surface of the cam structure therebelow.

13. In a steering knuckle of the type having clevises encircling the protruding ends of a king pin, fixed in the axle, and including an enclosed roller bearing in the upper clevis sustained upon a head resting on top of the axle; the combination of a lubricating installation for the bearings associated therewith including means for feeding lubricant into the knuckle from above the lower end of said roller bearing and a pipe fixed at its inlet end in said head and extending along the knuckle structure to a bearing thereof, said king pin having a bore leading to the lower bearing thereof, and means for dividing lubricant draining from said roller bearing between said king pin bore and said pipe.

14. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle structure carrying a steering control bearing; the combination therewith of a lubricating installation for the bearings associated with said knuckle and said axle, comprising a lubricant inlet supplying lubricant to the upper king pin bearing and a proportioning arrangement below said upper king pin bearing and ahead of the lower king pin bearing to distribute the lubricant from said inlet to said lower king pin bearing and said steering control bearing, said proportioning arrangement including means to dam the lubricant flow.

15. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle carrying drag link and tie rod steering control bearings; the combination therewith of a lubricating installation for the bearings associated with said knuckle and said axle, comprising a lubricant inlet supplying lubricant to said upper king pin bearing, a proportioning arrangement below the upper king pin bearing, and ahead of the lower king pin bearing to distribute the lubricant between said lower king pin bearing and said drag link and tie rod steering control bearings, and a second dividing arrangement positioned below and in communication with said first dividing arrangement for distributing the lubricant between said steering control bearings.

16. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle carrying steering control bearings; the combination therewith of a lubricating installation for the bearings associated with said knuckle and said axle comprising a lubricant inlet, a proportioning arrangement at the upper end of the king pin supplied from said inlet and distributing the lubricant to the upper and lower king pin bearings, and another proportioning arrangement positioned below the upper king pin bearing for distributing lubricant to said control bearings.

17. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements; the combination therewith of a lubricating installation for the bearings associated with said knuckle and said axle comprising a lubricant inlet attached to said axle, a proportioning arrangement on said axle associated with said inlet and separate conduits leading from said proportioning arrangement to the upper and lower king pin bearings.

18. The installation of claim 17 in which the knuckle carries control bearings and in which a proportioning arrangement is positioned adjacent the lower end of the king pin to proportion lubricant from said inlet between said control bearings.

19. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle carrying steering control bearings; the combination therewith of a lubricating installation for the bearings associated with said knuckle and said axle comprising a lubricant inlet, a proportioning arrangement receiving lubricant from said inlet and distributing it to said upper and lower king pin bearings and another proportioning arrangement receiving lubricant from said upper king pin bearing and distributing it to said control bearings.

20. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle carrying steering control bearings; the combination therewith of a lubricating installation for the bearings associated with said knuckle and said axle comprising a lubricant inlet supplying the upper king pin bearing, a proportioning arrangement receiving lubricant from the upper king pin bearing and distributing it in parallel to the lower king pin and control bearings.

21. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements and said knuckle carrying steering control bearings; the combination therewith of a lubricating installation for the bearings associated with said knuckle and said axle comprising a lubricant inlet, a proportioning arrangement incorporated with said inlet and distributing lubricant to the upper and lower ends of said king pin and conduits initiating adjacent the upper and lower ends of said king pin and leading to said control bearings.

22. In a motor vehicle of the type including an axle and a knuckle, one of which elements is provided with a clevis and the other of which is provided with an eye enclosed by said clevis, and a king pin extending through said eye and said clevis, said king pin being fixed to one of said elements and having upper and lower bearings within the other of said elements; the combination therewith of a lubricating installation for the king pin bearings and other bearings below the lower end of the king pin and associated with said knuckle and said axle, comprising a lubricant inlet, conduits leading from said lubricant inlet to the upper and lower king pin bearings, a lubricant well at the lower king pin bearing and a proportioning arrangement positioned at said well to distribute lubricant from said well between the said associated bearings.

23. In combination, an axle, a king pin having a tight fit in the eye thereof, a knuckle pivoted on said king pin and having a bearing thereon, means supplying lubricant to said knuckle from said axle, said means comprising a flow controlling fitting secured to the axle at a distance from the king pin and communicating by a longitudinal bore along the axis of said axle with a radial bore in said king pin, said king pin having an axial bore leading to said bearing.

24. In a motor vehicle, in combination, an axle, a knuckle having a pivot mount thereat below said axle, means delivering lubricant to said pivot mount, said means comprising a lubricant inlet control fitting means secured to the axle at a distance from said knuckle with a single inlet and a plurality of outlets feeding inward toward said axle and a plurality of bores in said axle and said pivot mount conveying the lubricant in parallel to the ends of the pivot mount.

25. In a motor vehicle of the type including an axle, a pivot stud rigid therewith, a knuckle bearing on said pivot stud, bearings associated with said knuckle, means admitting lubricant from the axle to the knuckle bearings, said means comprising a pair of flow controlling elements secured to the axle at a distance from the knuckle and feeding through corresponding bores longitudinally of the axle into the knuckle structure, one of said bores communicating upward to a knuckle bearing above the same and the other of said bores delivering downward to a knuckle bearing therebelow.

26. In a motor vehicle of the type including an axle, a king pin fixed in an eye thereof, a knuckle having a clevis straddling said axle and bearing on the ends of said king pin, and a structure carrying a plurality of bearings rigid with the lower jaw of the clevis; the combination therewith of means for lubricating at least two of the plurality of said bearings from a part on said axle, said means comprising a lubricant inlet on the axle, a passageway therefrom leading into the lower part of the lower clevis jaw, a dividing arrangement with outlet branches at the lower clevis jaw, and a pair of conduits connecting the branches of said dividing arrangement with the respective plurality of bearings to drain lubricant thereto.

27. In a motor vehicle of the type including an axle, with an axle eye at the end thereof, a clevis knuckle the clevis of which embraces said axle eye, a king pin fixed in said axle eye, the ends of which protrude into and bear within the clevis jaws of said knuckle; the combination therewith of a lubricating installation for the bearings associated with said knuckle comprising an inlet supplying the king pin bearing, a collecting chamber substantially below the upper king pin bearing receiving lubricant from said inlet, a conduit system from said collecting chamber leading to a plurality of other associated bearings, and a proportioning arrangement associated with said conduit system for distributing the lubricant to said other associated bearings.

28. In a mechanism provided with a plurality of spaced bearings at different levels, and including an anti-friction bearing at a relatively high level; a lubricating installation for said bearings comprising a lubricant inlet for feeding excess quantity of lubricant to above the anti-friction bearing, a collecting trough below the anti-friction bearing for collecting excess quantities of lubricant which have passed downwardly through the anti-friction bearing, a passageway system leading from said trough to the bearings at lower levels and a proportioning arrangement associated with said passageway system to correctly proportion lubricant between said bearings.

29. In combination with a steering knuckle, an axle, a pivotal mount between said steering knuckle and said axle, said pivotal mount including a plurality of bearings, the uppermost one of which is an anti-friction bearing, and other bearings associated with said knuckle below said anti-friction bearing; a lubricating installation for said bearings comprising an inlet to supply an excess quantity of lubricant to the upper part of the anti-friction bearing, a trough to collect the lubricant which is passed through said anti-friction bearing, a plurality of parallel conduits leading from said trough to said other bearings to be lubricated, and a proportioning arrangement for distributing the lubricant among said conduits.

30. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, a roller bearing serving as said upper bearing and an annular groove being provided in the knuckle structure surrounding said mount and positioned directly below said roller bearing for collecting lubricant which has seeped downwardly therethrough.

31. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, said system being also provided with means for dividing the lubricant before it is supplied to the upper bearing and means for conducting part of the lubricant to an associated bearing without passing it through the upper bearing.

32. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, the pivot mount being provided with upper and lower bearings and with means positioned adjacent to the upper end of the mount for supplying lubricant thereto and with dividing means positioned adjacent thereto for passing a part of the lubricant so supplied directly to a lower pivot mount bearing without passing it through the upper bearing.

33. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, said dividing and conducting means consisting in part of a wall or steeply inclined surface over which the lubricant is caused to flow downwardly, provided with one or more openings and deflectors positioned below said openings to break the flow of lubricant downwardly upon said wall or surface and to cause part of it to flow into said openings.

34. A knuckle lubrication system for a knuckle having upper and lower pivot mount bearings and knuckle control bearings, said system comprising means for supplying lubricant to the upper bearing, a collecting chamber below said bearing and a split conduit system leading to the control bearings from the chamber, said split conduit system including a single conduit from the collecting chamber, a branched conduit communicating with said single conduit, each of said branches leading to a control bearing and a dividing device at the place of branching comprising an inside chamber communicating with one branch and with the single conduit, an outside chamber communicating with the other branch, said outside chamber communicating with said inside chamber by a series of openings in the walls thereof and ledges positioned under said openings to break the flow of lubricant over the walls of the inside chamber.

35. A lubricating arrangement for a plurality of bearings at different levels comprising means to pass the lubricant to and through an upper bearing, means to collect and distribute the lubricant after said passage to one or more of a plurality of lower bearings and a lubricant dividing arrangement including a sloping surface, a chamber, openings from said surface into said chamber, means to flow a film of lubricant over said surface, obstructions upon said surface below said openings to break the flow of lubricant whereby part of said lubricant is diverted into said openings and thereby into said chamber and means to pass the divided lubricant to one or more of a plurality of said lower bearings, the sloping surface being a cylindrical surface and said chamber being a cylindrical chamber.

36. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, the pivot mount being fixed in an axle eye and protruding on either side thereof to receive a steering knuckle clevis, and an axial bore through the upper part of the pivot mount and an inlet connection extending along the axle and through the axle eye into the pivot mount bore being also provided.

37. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, the pivot mount being provided with upper and lower bearings, and an axial conduit being provided through the pivot mount for receiving lubricant which has passed through the upper bearing and for conducting said lubricant downwardly to the lower bearing.

38. In a lubricating system for a steering knuckle with associated bearings including an upper pivot mount bearing, means for supplying lubricant to the upper pivot mount bearing from above said bearing so that the lubricant will overflow and seep downwardly through said upper bearing, means for collecting lubricant which has passed through said upper bearing and means for dividing and conducting said lubricant to said associated bearings in the proper proportion, said dividing and conducting means consisting in part of a conduit from the collecting means to a plurality of said associated bearings, said conduit being split into a plurality of conduits leading to a corresponding number of associated bearings.

39. A knuckle lubrication system for the upper and lower king pin bearings of a knuckle structure comprising an inlet for supplying lubricant to adjacent the top of the knuckle structure above said upper king pin bearing, separate passageways leading to the upper and lower king pin bearings from adjacent the top of the knuckle structure and proportioning means for dividing the lubricant so that part will flow to the upper king pin bearing and part will flow to the lower king pin bearing, said means being positioned ahead of said king pin bearings and ahead of said passageways in the course of lubricant flow, the passageways being so arranged that the lubricant flowing to the lower king pin bearing will flow through an axial bore thereto, while the lubricant flowing to the upper king pin bearing will flow along the outside of the same.

40. A knuckle of the type including a pivot mount on an axle, a brake on said knuckle and a mechanism at the lower part of said knuckle below said mount for operating said brake; the combination therewith of means for feeding lubricant into said knuckle to supply the bearings of said mount and a drain passage from said mount to the mechanism therebelow, said knuckle being provided with means adjacent the lower portion of the pivot mount to assure proper supply of lubricant to the bearing of the pivot mount and to prevent excessive drainage of lubricant from said pivot mount into said drain passage to the mechanism.

JOSEPH BIJUR.